(12) United States Patent
Jaeger et al.

(10) Patent No.: US 8,882,354 B2
(45) Date of Patent: Nov. 11, 2014

(54) SYSTEM, METHOD AND APPARATUS FOR TOLERANCE RING WITH FUNCTIONAL LAYERS

(75) Inventors: Hans-Juergen Jaeger, Huerth (DE); Dominique Burgeff, Eupen (BE)

(73) Assignee: Saint-Gobain Performance Plastics Pampus GmbH, Willich (DE)

( * ) Notice: Subject to any disclaimer, the term of this patent is extended or adjusted under 35 U.S.C. 154(b) by 746 days.

(21) Appl. No.: 12/971,038

(22) Filed: Dec. 17, 2010

(65) Prior Publication Data

US 2011/0150375 A1 Jun. 23, 2011

Related U.S. Application Data

(60) Provisional application No. 61/287,732, filed on Dec. 18, 2009.

(51) Int. Cl.
*F16C 33/28* (2006.01)
*F16C 27/06* (2006.01)

(52) U.S. Cl.
CPC ........... *F16C 27/063* (2013.01); *F16C 2326/24* (2013.01); *F16C 33/28* (2013.01)
USPC .......................................................... 384/276

(58) Field of Classification Search
USPC ........... 384/535, 536, 276, 569, 581, 582, 37, 384/214, 222; 403/288, 365; 29/898.07, 29/898.12
See application file for complete search history.

(56) References Cited

U.S. PATENT DOCUMENTS

| | | | |
|---|---|---|---|
| 629,395 A | 7/1899 | Sargent | |
| 2,159,327 A | 3/1937 | Hendrick | |
| 2,357,106 A | 8/1944 | Grenot | |
| 2,733,108 A * | 1/1956 | Cowles | 384/582 |
| 3,033,623 A | 5/1962 | Thomson | |
| 3,206,264 A | 9/1965 | Dalzell et al. | |
| 3,348,887 A | 10/1967 | Sheps | |
| 3,447,846 A * | 6/1969 | Marsh | 384/536 |
| 3,501,360 A | 3/1970 | Mancel | |
| 3,899,227 A | 8/1975 | Harig | |
| 4,084,863 A | 4/1978 | Capelli | |
| 4,111,499 A | 9/1978 | McCloskey | |
| 4,358,167 A | 11/1982 | Magazian et al. | |
| 4,846,590 A | 7/1989 | Teramachi | |

(Continued)

FOREIGN PATENT DOCUMENTS

| | | |
|---|---|---|
| BE | 534482 A | 1/1955 |
| DE | 3613123 A1 | 10/1987 |

(Continued)

OTHER PUBLICATIONS

The International Search Report and the Written Opinion for International Application No. PCT/EP2011/050658 received from the European Patent Office, dated Apr. 29, 2011, 14 pages.

(Continued)

*Primary Examiner* — Thomas Diaz
(74) *Attorney, Agent, or Firm* — Chi Suk Kim; Abel Law Group, LLP

(57) ABSTRACT

A tolerance ring with functional layers has an annular band and an elastomeric layer. The assembly also may have a low friction layer, which may be bonded, calendared or laminated thereto. The low friction material may completely encapsulate the annular band.

13 Claims, 8 Drawing Sheets

(56) References Cited

U.S. PATENT DOCUMENTS

| | | | |
|---|---|---|---|
| 5,062,721 A * | 11/1991 | Chiba | 384/536 |
| 5,125,755 A | 6/1992 | Adler et al. | |
| 5,127,218 A | 7/1992 | Schiesser et al. | |
| 5,229,198 A | 7/1993 | Schroeder | |
| 5,616,406 A | 4/1997 | Nakamaru et al. | |
| 6,106,936 A | 8/2000 | Adam | |
| 6,148,491 A | 11/2000 | Bartocci | |
| 6,390,682 B1 | 5/2002 | McMeekin et al. | |
| 6,416,226 B1 | 7/2002 | Provence et al. | |
| 6,425,977 B2 | 7/2002 | McDonald et al. | |
| 6,478,468 B2 | 11/2002 | McMeekin et al. | |
| 6,480,363 B1 | 11/2002 | Prater | |
| 6,485,608 B1 | 11/2002 | McDonald et al. | |
| 7,717,407 B2 | 5/2010 | Welsch | |
| 7,832,933 B2 | 11/2010 | Adams et al. | |
| 7,942,581 B2 | 5/2011 | Leonardelli | |
| 8,021,072 B2 | 9/2011 | Court et al. | |
| 8,118,492 B2 | 2/2012 | Weiden et al. | |
| 2004/0057643 A1 | 3/2004 | Blanchard et al. | |
| 2005/0070365 A1 | 3/2005 | Riefe et al. | |
| 2006/0251887 A1 | 11/2006 | Welsch | |
| 2006/0276246 A1 | 12/2006 | Needes et al. | |
| 2009/0180720 A1 | 7/2009 | Weiden et al. | |
| 2009/0256341 A1 | 10/2009 | Okada et al. | |
| 2011/0150377 A1 | 6/2011 | Hartmann | |
| 2011/0176757 A1 | 7/2011 | Heldmann et al. | |

FOREIGN PATENT DOCUMENTS

| | | | |
|---|---|---|---|
| DE | 20200500686 U1 | 8/2006 | |
| DE | 202005006868 U1 | 8/2006 | |
| EP | 0656252 A1 | 6/1995 | |
| EP | 1305530 B1 | 5/2003 | |
| EP | 1754646 A2 | 2/2007 | |
| GB | 821472 | 10/1959 | |
| GB | 821472 A | 10/1959 | |
| GB | 2136063 A | 9/1984 | |
| GB | 2260338 | 4/1993 | |
| GB | 2260338 A | 4/1993 | |
| JP | S6113025 A | 1/1986 | |
| JP | S63187747 A | 8/1988 | |
| JP | 04236815 A * | 8/1992 | F16C 25/08 |
| JP | 06017820 | 1/1994 | |
| JP | 6017820 A | 1/1994 | |
| JP | H0635643 U | 5/1994 | |
| JP | H11115773 A | 4/1999 | |
| RU | 2198327 C2 | 2/2003 | |
| WO | 2005/105431 | 11/2005 | |
| WO | 2005105431 A1 | 11/2005 | |
| WO | 2007012592 A1 | 11/2007 | |
| WO | 2010/038137 | 4/2010 | |
| WO | 2010038137 A1 | 4/2010 | |
| WO | 2011073412 A1 | 6/2011 | |
| WO | 2011073413 A1 | 6/2011 | |
| WO | 2011089145 A1 | 7/2011 | |

OTHER PUBLICATIONS

The International Preliminary Report on Patentability for International Application No. PCT/EP2010/070124 received from the International Bureau of WIPO, dated Jun. 28, 2012, 8 pages.

The International Search Report and the Written Opinion for International Application No. PCT/EP2010/070123 received from the European Patent Office, dated Mar. 2, 2011, 18 pages.

International Search Report of App. No. PCT/EP2011/050658 (2 pgs.).

International Search Report of App. No. PCT/EP2010/070124 (2 pgs.).

International Search Report of App. No. PCT/EP2010/070123 (2 pgs.).

* cited by examiner

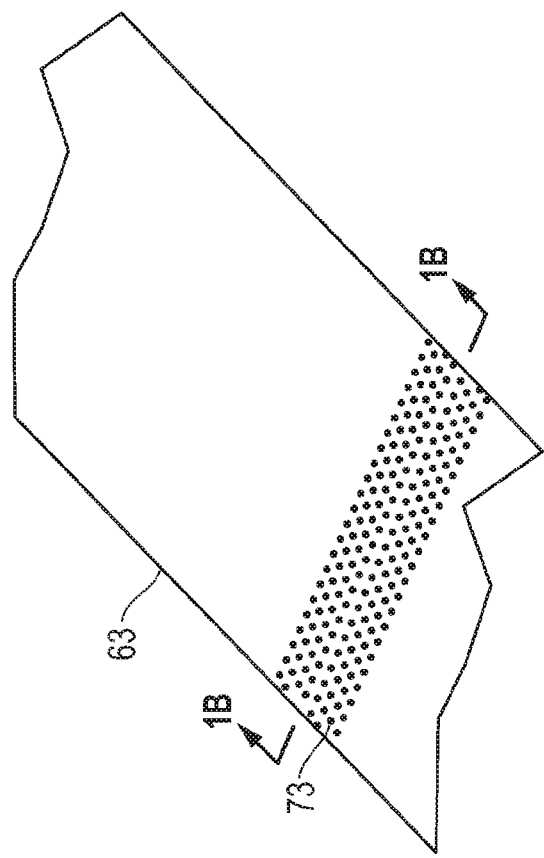
FIG. 1B
FIG. 1A

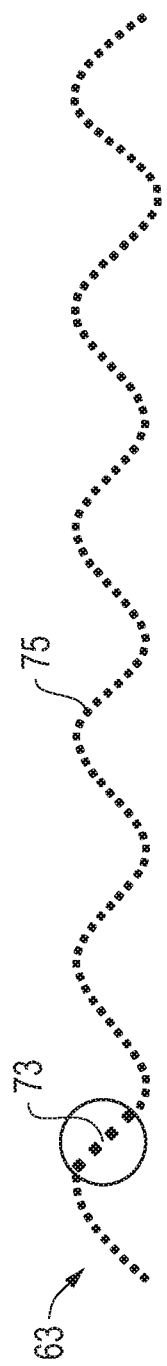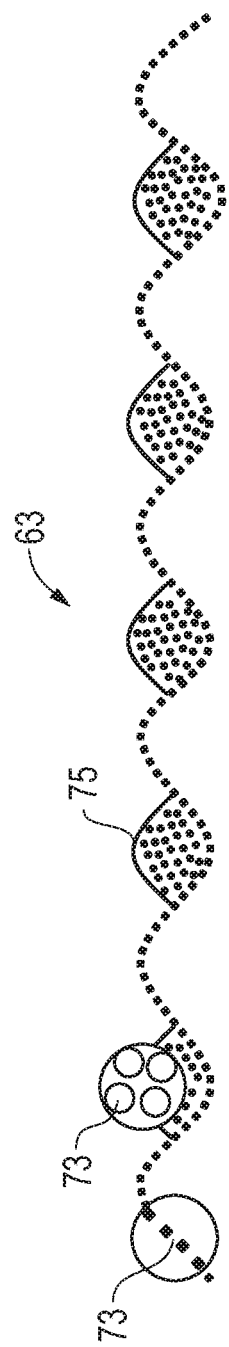
FIG. 2
FIG. 3

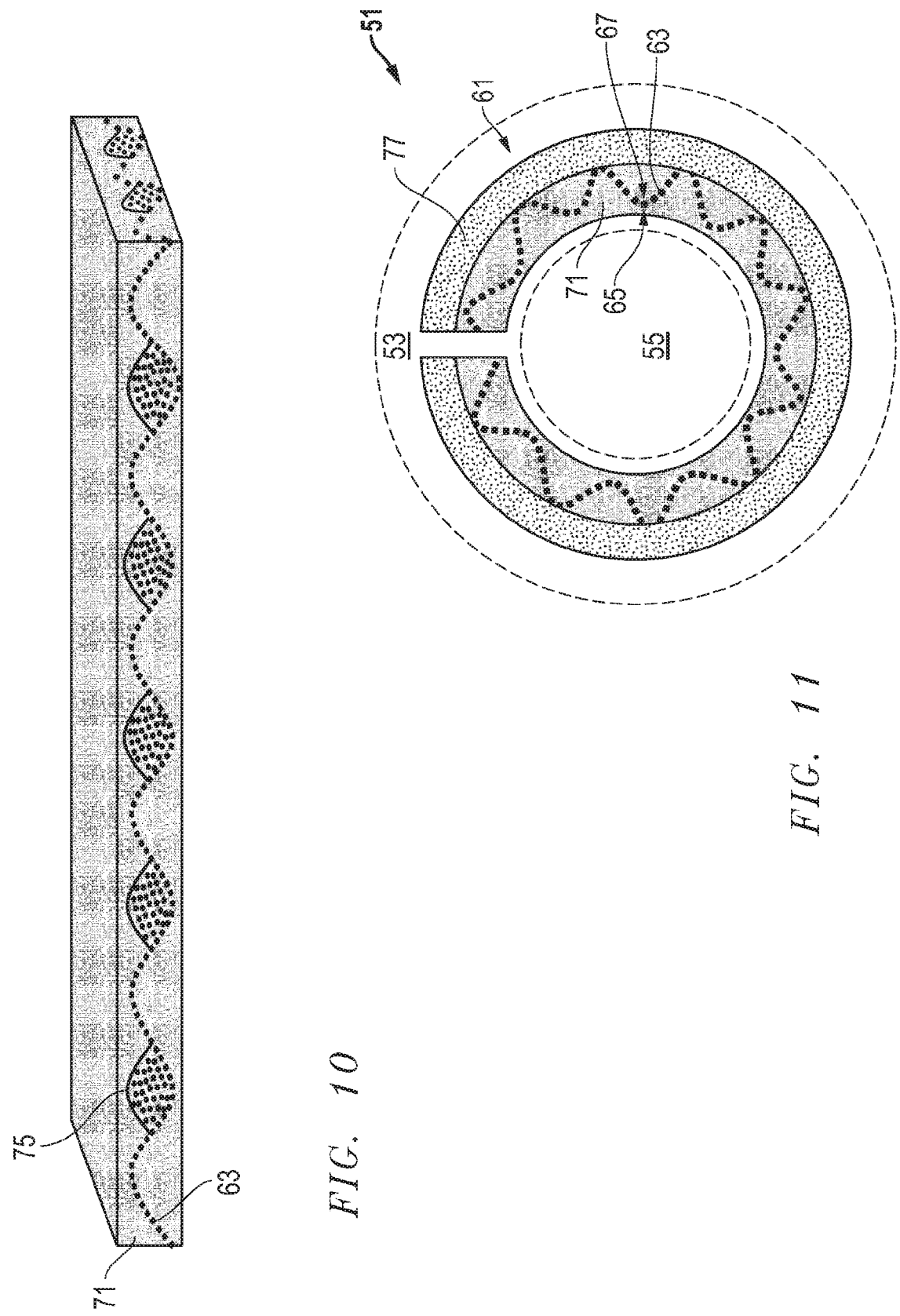

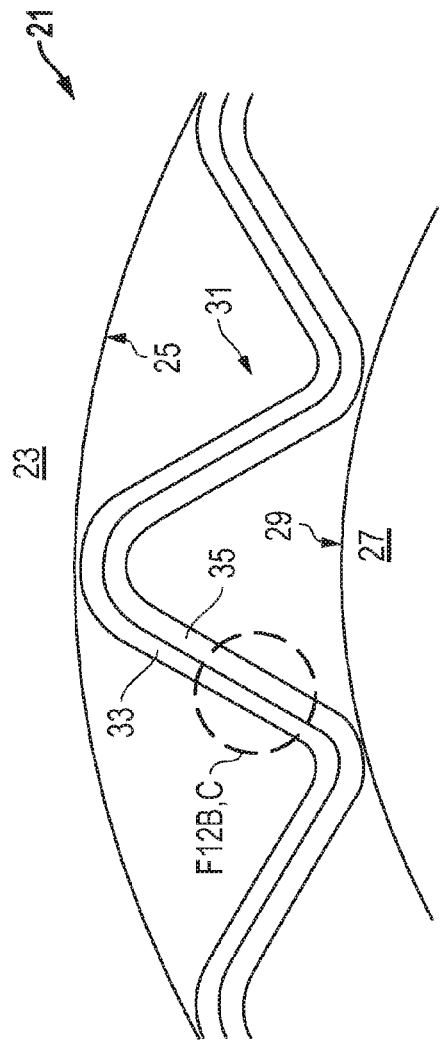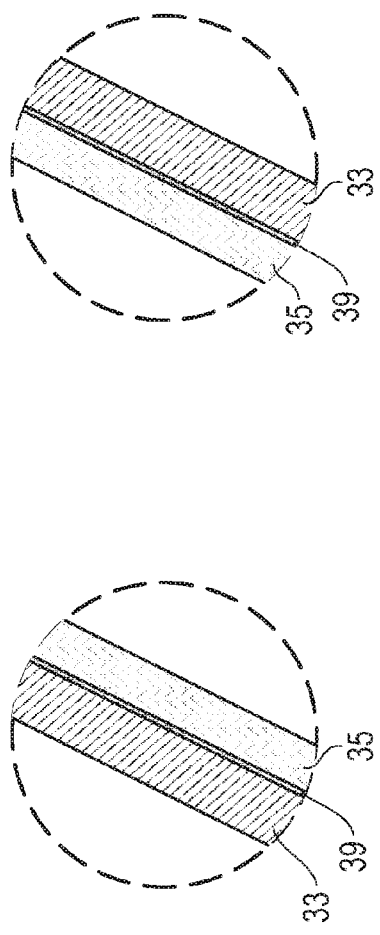

ABSTRACT

SYSTEM, METHOD AND APPARATUS FOR TOLERANCE RING WITH FUNCTIONAL LAYERS

This application claims priority to and the benefit of U.S. Prov. Pat. App. No. 61/287,732, filed on Dec. 18, 2009, and is incorporated herein by reference in its entirety.

FIELD OF THE DISCLOSURE

The invention relates in general to tolerance rings that are located between moving parts and, in particular, to an improved system, method and apparatus for a tolerance ring with functional layers.

BACKGROUND

Tolerance rings constrain movement between parts that move relative to each other, such as rotating shafts in housing bores. One type of tolerance ring is an annular band located in the gap between the outer surface of a shaft and the inner surface of a bore. This tolerance ring limits radial or axial motion of the shaft within the bore while still permitting relative movement.

In conventional tolerance ring configurations, a close fit is sought between the inner and outer components. In addition, either forces for providing maximal frictional engagement or minimal variation in sliding forces are sought. A close fit between the components is desirable because it reduces relative vibration between the parts. Thus, tolerance rings are able to compensate for tolerances or misalignments, create torque and can improve other properties, such as noise, vibration and harshness (NVH) properties. Torque and even NVH are mainly influenced by the material properties of common tolerance rings, which are usually formed only from stainless steel. These requirements between the inner and outer components require strong and substantial contact, which increases frictional forces. Although these solutions are workable for some applications, improvements in tolerance rings continue to be of interest.

SUMMARY OF THE INVENTION

Embodiments of a system, method and apparatus for tolerance rings with functional layers are disclosed. In some versions, a tolerance ring assembly comprises an outer component, an inner component located in the outer component that is movable relative thereto, and a tolerance ring mounted between the inner and outer components. The tolerance ring may comprise a metallic annular band and an elastomeric layer secured to the metallic layer.

In other embodiments, the assembly further comprises a low friction layer on at least one of the annular band and the elastomeric layer. The annular band may be formed from spring steel and the low friction layer may be laminated to at least one side of the annular band to improve sliding properties of the tolerance ring. The low friction layer may be located on the annular band opposite the elastomeric layer. The low friction layer may comprise PTFE and be bonded to the annular band or the elastomeric layer. The assembly may further comprise an adhesive or primer layer between the annular band and the elastomeric layer.

In still other embodiments, the tolerance ring comprises an annular band formed from a metallic material having radial inner and outer surfaces. The low friction material encapsulates the annular band, such that both the radial inner and outer surfaces are located substantially completely within the low friction material. The annular band may be located completely within the low friction material such that no portion or only some portion of the annular band is exposed from and external to the low friction material. The annular band may comprise spring steel and be perforated or stamped. The annular band may comprise geometrical formations such as waves that are formed therein by coining or deep drawing. Moreover, the annular band may be encapsulated within the low friction material by calendaring or laminating.

In some embodiments, the low friction material may form a smooth cylindrical profile, and the annular band undulates in a non-cylindrical profile within the smooth cylindrical profile. The low friction material and the annular band each may have non-cylindrical profiles and be complementary in shape to each other. The tolerance ring may further comprise a backing layer joined to the tolerance ring.

In additional embodiments, a method of forming a tolerance ring comprises providing a sheet formed from a metallic material, forming apertures in the sheet, fabricating geometrical formations into the sheet to form a sheet profile; encapsulating the sheet profile in a low friction material, and forming the encapsulated sheet profile into an annular shape to form a tolerance ring. The annular band may have radial inner and outer surfaces with the low friction material encapsulating the annular band, such that both the radial inner and outer surfaces are substantially located within the low friction material. The method may further comprise forming shapes in the low friction material that are complementary in shape to the geometrical formations in the sheet profile.

BRIEF DESCRIPTION OF THE DRAWINGS

The present disclosure may be better understood, and its numerous features and advantages made apparent to those skilled in the art by referencing the accompanying drawings.

FIGS. 1A and B are top and sectional side views of one embodiment of a perforated metallic sheet constructed in accordance with the invention;

FIGS. 2 and 3 are sectional side views of other embodiments of formed version of the perforated metallic sheet constructed in accordance with the invention;

FIG. 10 is an isometric view of the embodiment of FIG. 5 and is constructed in accordance with the invention;

FIG. 11 is a sectional side view of an embodiment of a tolerance ring constructed in accordance with the invention;

FIGS. 12A, B and C are sectional side views of other embodiments of tolerance rings constructed in accordance with the invention;

The use of the same reference symbols in different drawings indicates similar or identical items.

DESCRIPTION OF THE DRAWINGS

Embodiments of a system, method and apparatus for tolerance rings with functional layers are disclosed in FIGS.

Figure 14C:
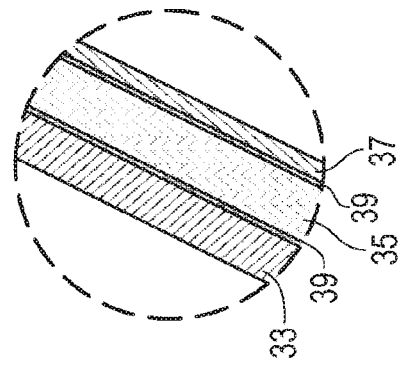
FIGS. 14A, B and C are sectional side views of still other embodiments of tolerance rings constructed in accordance with the invention.
Figure 13:
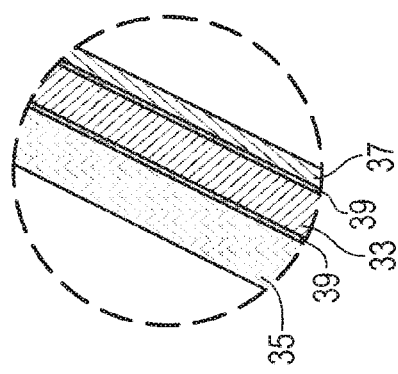
FIG. 13 is a sectional side view of another embodiment of a tolerance ring constructed in accordance with the invention.
Figure 14B:
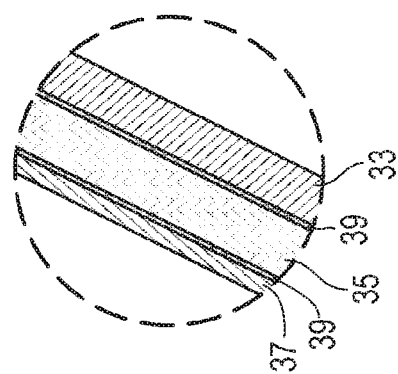
Figure 14A:
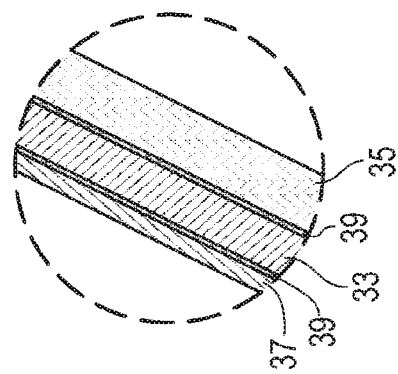

1-14. For example, FIGS. 12-14 depict a tolerance ring assembly 21 comprising an outer component 23 having a bore 25 with an axis therein. An inner component 27 is mounted in the bore 25 of the outer component 23 and has an outer surface 29. The inner component 27 mates with the outer component 23 and is movable relative thereto. A tolerance ring 31 is located in the bore 25 between the inner and outer components 23, 27. The tolerance ring 31 comprises an annular band 33 formed from a metallic material, an elastomeric layer 35 on the annular band 33, and a low friction layer 37 (FIG. 13) on at least one of the annular band 33 and the elastomeric layer 35.

The annular band 33 may be formed from spring steel and the low friction layer 37 may be laminated to at least one side of the annular band. The low friction layer 37 may be located on the annular band 33 opposite the elastomeric layer 35, as shown in FIG. 13. The low friction layer 37 may comprise PTFE and be bonded with a glue or adhesive 39 to one of the annular band 33 and the elastomeric layer 35. The elastomeric layer may comprise, for example, nitrile rubber, olefinic elastomeric, polyether-/polyester-elastomeric, ethylene-propylene-elastomeric, ethylene-acrylic rubber and fluoro elastomeric materials. The adhesive 39 also may comprise a primer between the annular band 33 and the elastomeric layer 35, and between the low friction layer 37 and the annular band and/or elastomeric layer.

Referring now to FIG. 11, embodiments also may comprise an assembly 51 having an outer component 53, an inner component 55 located in the outer component 53 that is movable relative thereto. A tolerance ring 61 is mounted between the inner and outer components 53, 55. The tolerance ring comprises an annular band 63 formed from a metallic material and having radial inner and outer surfaces 65, 67. A low friction material 71 encapsulates the annular band 63, such that both the radial inner and outer surfaces 63, 65 are substantially located within the low friction material 71.

Figure 4:
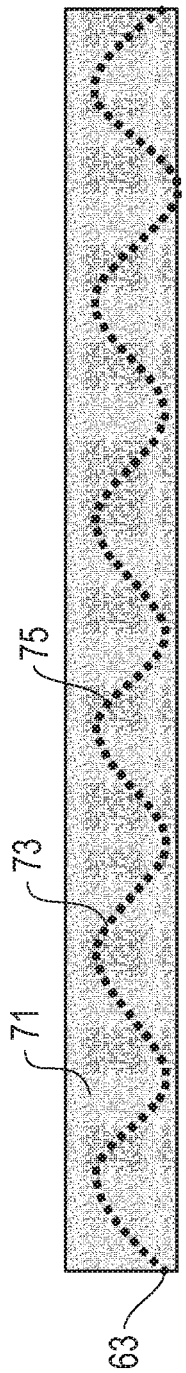
FIGS. 4 and 5 are sectional side views of still other embodiments of encapsulated, formed, perforated metallic sheet constructed in accordance with the invention.
Figure 5:
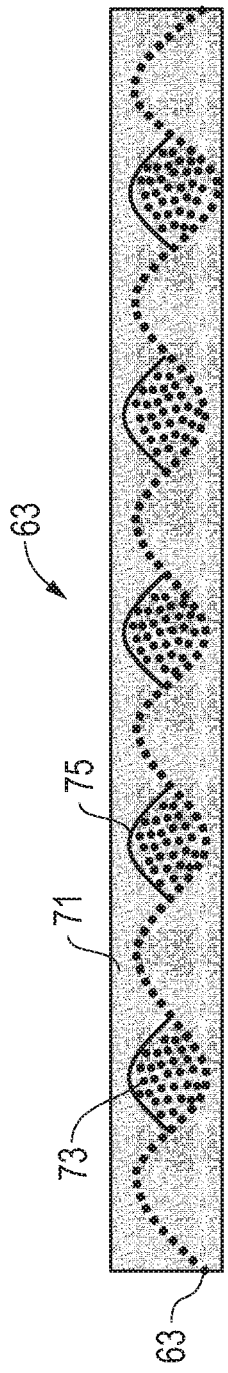
Figure 6:
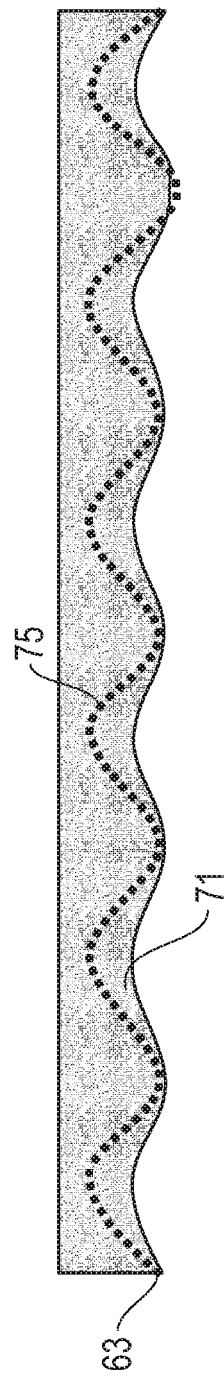
FIGS. 6 and 7 are sectional side views of additional embodiments of encapsulated, formed, perforated metallic sheet constructed in accordance with the invention.
Figure 7:
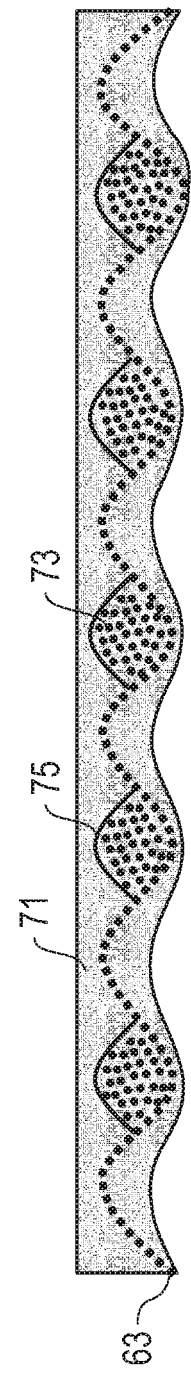
Figure 8:
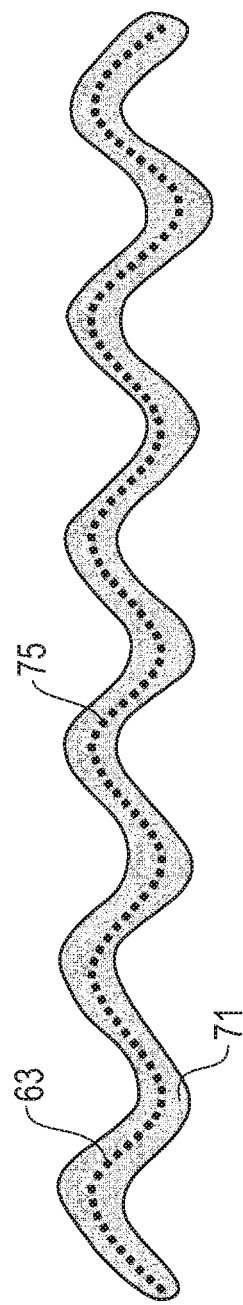
FIGS. 8 and 9 are sectional side views of other embodiments of encapsulated, formed, perforated metallic sheet constructed in accordance with the invention.
Figure 9:
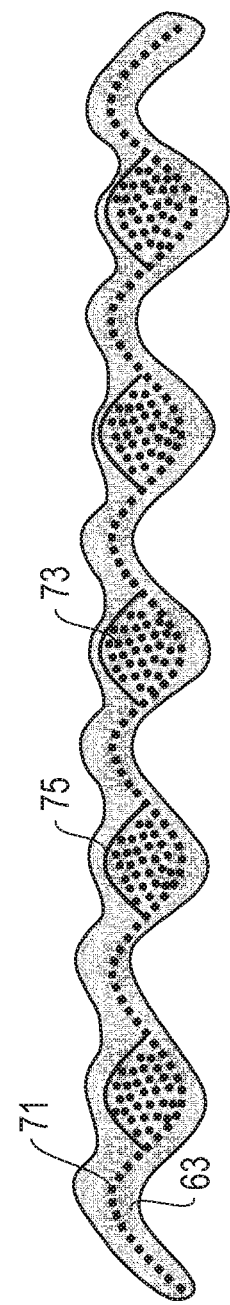

As shown in FIGS. 8 and 9, the band 63 may be located completely within the low friction material 71 such that no portion of the band 63 is exposed from and external to the low friction material 71. In other embodiments (FIGS. 4-7), at least a portion of the band 63 is exposed from and extends externally relative to the low friction material 71. The band 63 may be formed from spring steel and may be perforated or stamped 73, as shown in FIGS. 1A and 1B. FIGS. 2 and 3 illustrate that the band 63 may comprise geometrical formations 75 that are formed therein by coining or deep drawing. The geometrical formations 75 may comprise waves, cones or ball-shaped formations, as shown in FIGS. 4 and 5. The band 63 may be encapsulated within the low friction material by calendaring and sintering (FIGS. 4-7) or laminating (FIGS. 8 and 9). As shown in FIGS. 8 and 9, the low friction material 71 laminated to the band 63 may comprise a PTFE compound tape.

In some embodiments, (FIGS. 4, 5 10 and 11), the low friction material 71 may form a smooth profile (e.g., cylindrical in its final form in FIG. 11), such that the band 63 undulates in a non-cylindrical profile within the smooth cylindrical profile of material 71. In other embodiments (FIGS. 6-9), both the low friction material 71 and the band 63 each have non-cylindrical profiles and are complementary in shape to each other.

The embodiment of FIG. 11 further comprises a backing layer 77 that is joined to the tolerance ring assembly 61. The backing layer 77 may be formed from, for example, steel, Al, Cu and Ti, and is radially external to the low friction layer 71. In some embodiments, the low friction layer 71 is laminated on the backing layer 77. In some versions, the low friction layer may comprise a thickness of approximately 0.1 to 0.05 mm on each of the radial inner and outer surfaces 65, 67 of the band 63. Moreover, the low friction layer 71 may be bonded or welded to the band 63.

In still other embodiments, a method of forming a tolerance ring comprises providing a sheet formed from a metallic material; forming apertures in the sheet; fabricating geometrical formations into the sheet to form a sheet profile; encapsulating the sheet profile in a low friction material; and forming the encapsulated sheet profile into an annular shape to form a tolerance ring.

The aperture formation may comprise forming shaped holes in the sheet by perforating or stamping. The fabricating of geometrical formations into the sheet may be accomplished by coining, forming or deep drawing waves, balls or cones to form the sheet profile. The encapsulating step may be performed in the sheet profile in the low friction material by calendaring or laminating through the apertures in the sheet. The sheet may be formed into an annular band having radial inner and outer surfaces. The low friction material encapsulates the annular band such that both the radial inner and outer surfaces are located within the low friction material.

The method may further comprise, after encapsulation, forming shapes in the low friction material that are complementary in shape to the geometrical formations in the sheet profile. The forming shapes step may comprise coining, calendaring and/or sintering the low friction material. The fabricating and encapsulating steps may occur before or after each other, and the encapsulation may occur via lamination. The method may further comprise installing a backing layer to the tolerance ring, such as on a radial exterior of the low friction layer.

The embodiments disclosed herein have significant advantages over conventional solutions. For example, the combination of a tolerance ring and an elastomeric backing improves the design of tolerance rings with softer performance. The term soft is used in terms of providing torque at a lower level with less variation. In terms of NVH, these materials significantly decouple the two mating parts that are connected by the tolerance ring without diminishing other areas of performance. As a result, these designs significantly reduce noise and vibration.

In another example, a metallic material with spring behavior is coated with an adhesive and/or primer and combined with an elastomeric layer to form a composite material. The metal may comprise, e.g., stainless steel, carbon steel or other resilient metals. The elastomeric backing may comprise, e.g., nitrile rubber, neoprene rubber, silicone rubber, olefinic elastomeric, polyether-/polyester-elastomeric, ethylene-propylene-elastomeric, ethylene-acrylic rubber and/or fluoro elastomeric. In other embodiments, the tolerance ring may comprise an inner metallic layer and an external elastomeric layer.

In other embodiments, a sliding or low friction layer is added to the structure. These designs improve the sliding properties of the tolerance compensating element. For example, the low friction material may comprise PTFE on the elastomeric layer, and/or even on the metal side opposite to the elastomeric layer. Like the elastomeric layer, the low friction layer also may be bonded to the tolerance ring (e.g., either the metallic or elastomeric layer) with an adhesive or glue.

In still other embodiments, a resilient metallic layer is laminated with a low friction material. The metal surface may then be coated with an adhesive and/or primer and combined with an elastomeric layer to form a composite material. Other combinations also are possible. Some embodiments include a tolerance ring that is completely encapsulated by the low friction layer compound. For example, a composite structure having a perforated metallic core formed from spring steel is completely encapsulated with PTFE.

Both the composition and the production method are different from a conventional sliding bearing, and also different from a conventional tolerance ring. With the described encapsulated tolerance ring several different functions are provided. These embodiments act as a sliding bearing with additional tolerance compensation, a defined torque can be applied, and they work as tolerance rings with improved friction properties.

As a substrate or an intermediate layer, a spring steel material sheet or coil may be first perforated, then shaped (e.g., in waves, ball-like shapes, and/or other deep-drawn or coined shapes). These shaped areas may be regularly distributed and formed closely together. Thus, in some embodiments, there are as many waves on these tolerance rings as on conventional tolerance rings. In some embodiments, the spring steel core is fully embedded or encapsulated so that the resulting compound strip shows no waviness at all, and appears as a block-like shape.

The encapsulation may be achieved, for example, by a calendaring process or through laminating a tape onto the steel core. Optionally, in the latter case, a strong backing material may be added to the structure or core to make the bearing capable for press fitting in housings.

General applications for embodiments of this composite structure may be used to produce sliding bearings for clearance-free or clearance-reduced applications, or to produce tolerance rings with low retention force. The metallic core formed from spring steel acts as a spring and thus provides the tolerance adjustment between the bearing surface and, e.g., a shaft by using the low friction compound-coated spring waves. The low friction layer may engage only the functional side of the shaft or counterpart. Alternatively, it may engage both components, and/or provide a retention force needed between the mating components. The low friction layer allows the composite structure to work as a conventional sliding bearing or provide a relatively low retention force due to the intrinsic low coefficient of friction of the low friction material.

The tolerance ring may provide sliding force control (e.g., axial or rotational) when used between mating components such as steering column lock mechanisms. The tolerance ring prevents overload by allowing rotation between components once a threshold torque level has been reached. For example, in steering column energy absorption systems, a tolerance ring allows axial slippage to occur once an axial force level is reached.

In general, waves having a lower stiffness generate a low torque bearing and higher stiffness waves generate higher torques, such as for door hinge applications. These types of performance may be achieved by designing the tolerance ring waves to have spring characteristics that generate the correct level of radial force that, when combined with the friction characteristics of the assembly, produce the desired sliding force levels.

The elastic/plastic nature of the wave spring characteristics is used to limit the force variation experienced across the typical dimensional tolerances of the assembly. This maintains a reasonably consistent sliding force. Manipulation of forces is achieved by design of wave geometry, material thickness and hardness. To cope with component dimensional tolerances, the tolerance ring waves are typically designed to be compressed by an amount greater than the tolerance on the clearance in which the waves are installed.

A limitation exists where relatively low sliding or rotational force levels are required (such as in steering column adjustment mechanisms), or where the tolerance ring acts as a pivot bush. In these applications forces are generally too high and radial stiffness too low. It is possible to reduce the stiffness of the tolerance ring waves to limit maximum forces, but this can result in assemblies with low radial load-carrying capability. Even with relatively low stiffness waves the sliding force level produced may be too high.

In other embodiments, the low friction layer may comprise materials including, for example, a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the material includes polyketone, such as polyether ether ketone (PEEK), polyether ketone, polyether ketone ketone, polyether ketone ether ketone, a derivative thereof, or a combination thereof. An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. In an additional example, the thermoplastic polymer may be ultra high molecular weight polyethylene.

Lubrication of the sliding surface (e.g., with oil or grease) may be used in high force applications. Exemplary solid lubricants may include molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof.

A combination of the spring characteristics of the tolerance ring-type core with the low friction/lubrication characteristics of a low friction compound-based outer surface provides a lower friction sliding interface. This design enables tolerance rings to be designed to operate on a higher torque level for sliding bearing applications, and over wider clearances with higher radial load strength and lower sliding forces than are possible with conventional tolerance rings.

Applications for such embodiments include, for example, hinge assemblies for portable electronics such as laptop computers and cellular telephones. These applications require hinge mechanisms that provide a low retention force at a well-defined torque over the lifetime of the product. Traditional bearings do provide a low retention force as well as a well-defined initial torque. However, with the invention, the torque value may be kept relatively constant over the product lifetime due to the spring adjust function of the spring steel waves combined with low wear of the low friction layer. In contrast, traditional tolerance rings provide a strong retention force but with high friction.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A tolerance ring comprising:
   an annular band formed from a metallic material wherein the metallic material consist of a sheet comprising a plurality of circular perforations, the circular perforations evenly distributed across the sheet and the sheet shaped to include a sheet profile, the sheet profile including waves, cones, or ball shapes, wherein the annular band is located completely within a low friction layer such that no portion of the annular band is exposed from and external to the low friction layer;
   an elastomeric layer on the annular band; and
   the low friction layer on at least one of the annular band and the elastomeric layer, wherein the low friction material comprises a polymer selected from the group consisting of a polyketone, a polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, and any combination thereof.

2. A tolerance ring according to claim 1, wherein the annular band is formed from spring steel and the low friction layer is laminated to at least one side of the annular band.

3. A tolerance ring according to claim 1, wherein the low friction layer is on the annular band opposite the elastomeric layer.

4. A tolerance ring according to claim 1, wherein the low friction layer comprises PTFE and is bonded to one of the annular band and the elastomeric layer, and the elastomeric layer comprises one of nitrile rubber, olefinic elastomeric, polyether-/polyester-elastomeric, ethylene-propylene-elastomeric, ethylene-acrylic rubber and fluoro elastomeric materials.

5. A tolerance ring according to claim 1, further comprising an adhesive or primer layer between the annular band and the elastomeric layer, and between the low friction layer and said at least one of the annular band and the elastomeric layer.

6. An assembly, comprising:
   an outer component;
   an inner component located in the outer component and movable relative thereto;
   a tolerance ring mounted between the inner and outer components, the tolerance ring comprising:
      an annular band formed from a metallic material and having radial inner and outer surfaces, wherein the metallic material consist of a sheet comprising a plurality of circular perforations, the circular perforations evenly distributed across the sheet and the sheet shaped to include a sheet profile, the sheet profile including waves, cones, or ball shapes, wherein the annular band is located completely within a low friction material such that no portion of the annular band is exposed from and external to the low friction material; and
      the low friction material encapsulating the annular band, such that both the radial inner and outer surfaces are substantially located within the low friction material, wherein the low friction material comprises a polymer selected from the group consisting of a polyketone, a polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, and any combination thereof.

7. An assembly according to claim 6, wherein at least a portion of the annular band is exposed from and extends externally relative to the low friction material.

8. An assembly according to claim 6, wherein the annular band is spring steel and is perforated or stamped.

9. An assembly according to claim 6, wherein the annular band is encapsulated within the low friction material by calendaring or laminating.

10. An assembly according to claim 6, wherein the low friction material forms a smooth cylindrical profile, and the annular band undulates in a non-cylindrical profile within the smooth cylindrical profile.

11. An assembly according to claim 6, wherein the low friction material and the annular band each have non-cylindrical profiles and are complementary in shape to each other.

12. An assembly according to claim 6, further comprising a backing layer joined to the tolerance ring, the backing layer is formed from one of steel, Al, Cu and Ti, and is radially external to the low friction layer, and the low friction layer is laminated on the backing layer.

13. An assembly according to claim 6, wherein the low friction layer has a thickness of approximately 0.1 to 0.05 mm on each of the radial inner and outer surfaces of the annular band, and the low friction layer is bonded or welded to the annular band.

* * * * *